United States Patent
Hassan

[19]

[11] Patent Number: 5,901,185
[45] Date of Patent: May 4, 1999

[54] SYSTEMS AND METHODS FOR DATA-AUGMENTED, PILOT-SYMBOL-ASSISTED RADIOTELEPHONE COMMUNICATIONS

[75] Inventor: Amer Hassan, Cary, N.C.

[73] Assignee: Ericsson Inc., Research Triangle Park, N.C.

[21] Appl. No.: 08/631,141

[22] Filed: Apr. 15, 1996

[51] Int. Cl.$^6$ .............................. H04B 1/10; H04L 27/22
[52] U.S. Cl. ......................... 375/346; 375/285; 370/522
[58] Field of Search .................................... 375/346, 285; 455/296; 370/522, 527

[56] References Cited

U.S. PATENT DOCUMENTS 5,414,734  5/1995  Marchetto et al. ..................... 375/267

FOREIGN PATENT DOCUMENTS 0 715 440 A1  6/1996  European Pat. Off. .
WO95/35615  12/1995  WIPO .

OTHER PUBLICATIONS

"An Analysis of Pilot Symbol Assisted 16 QAM in the Rayleigh Fading Channel" Chong et al. IEEE vol.41, No.4, Nov. 1995.
"Pilot Symbol Assisted Modulation and Differntial Detection In Fading and Delay Spread" Cavers, IEEE vol 43, No.7, Jul. 1995.
"Cochannel Interference and Pilot Symbol Assisted Modulation" Cavers et al. IEEE vol.42, No.4., Nov. 1993.
International Search Report, PCT/US97/06490, Sep. 16, 1997.
Cavers, Pilot Symbol Assisted Modulation in Fading and Delay Spread, IEEE, 1993, pp. 13–16.
Cavers, An Analysis of Pilot Symbol Assisted Modulation for Rayleigh Fading Channels, IEEE Transactions on Vehicular Technology, vol. 40, No. 4, Nov. 1991, pp. 686–693.
Moher et al., TCMP–A Modulation and Coding Strategy for Rician Fading Channels, IEEE Journal on Selected Areas in Communications, vol. 7, No. 9, Dec. 1989, pp. 1347–1355.
Sampei et al., Rayleigh Fading Compensation Method for 16QAM in Digital Land Mobile Radio Channels, Proceedings of the IEEE Vehicular Technology Conference, 1989, pp. 640–646.
Lodge et al., Time Diversity for Mobile Satellite Channels Using Trellls Coded Modulations, IEEE Global Telecommunications Conference, 1987, pp. 303–307.

*Primary Examiner*—Temesghen Ghebretinsae
*Attorney, Agent, or Firm*—Myers Bigel Sibley & Sajovec

[57] ABSTRACT

Radiotelephone communications, such as voice or data, are processed to produce a pilot symbol assisted modulation (PSAM) communications symbol sequence, the PSAM communications symbol sequence including a plurality of predetermined pilot symbols interleaved with a plurality of information symbols representing the radiotelephone communications. The PSAM communications symbol sequence is communicated over a radiotelephone communications channel having a transfer characteristic, producing a sequence of communications symbol data representing the communicated sequence of communication symbols. Pilot symbol data, corresponding to pilot symbols, and information symbol data, corresponding to information symbols, are identified in the sequence of communications symbol data. A data-augmented estimate of the transfer characteristic of the radiotelephone communications channel is generated from the pilot symbol data and the information symbol data. Estimates of information symbols are generated from the corresponding information symbol data and the generated estimate of the transfer characteristic. Radiotelephone communications are decoded from the generated estimates of the information symbols. Preferably, estimates of the transfer characteristic are iteratively generated by identifying a group of information symbol data corresponding to a group of information symbols, generating estimates of the group of identified information symbols from the group of information symbol data and a previously generated estimate of the radiotelephone communications channel transfer characteristic, and generating a new estimate of the transfer characteristic from the pilot symbol data, the information symbol data, and previously generated estimates of information symbols.

22 Claims, 11 Drawing Sheets

SYSTEMS AND METHODS FOR DATA-AUGMENTED, PILOT-SYMBOL-ASSISTED RADIOTELEPHONE COMMUNICATIONS

FIELD OF THE INVENTION

The present invention relates to communications systems and methods, in particular, to radiotelephone communications systems and methods.

BACKGROUND OF THE INVENTION

Radiotelephone systems are commonly employed to provide voice and data communications to a plurality of mobile units or subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Figure 1:
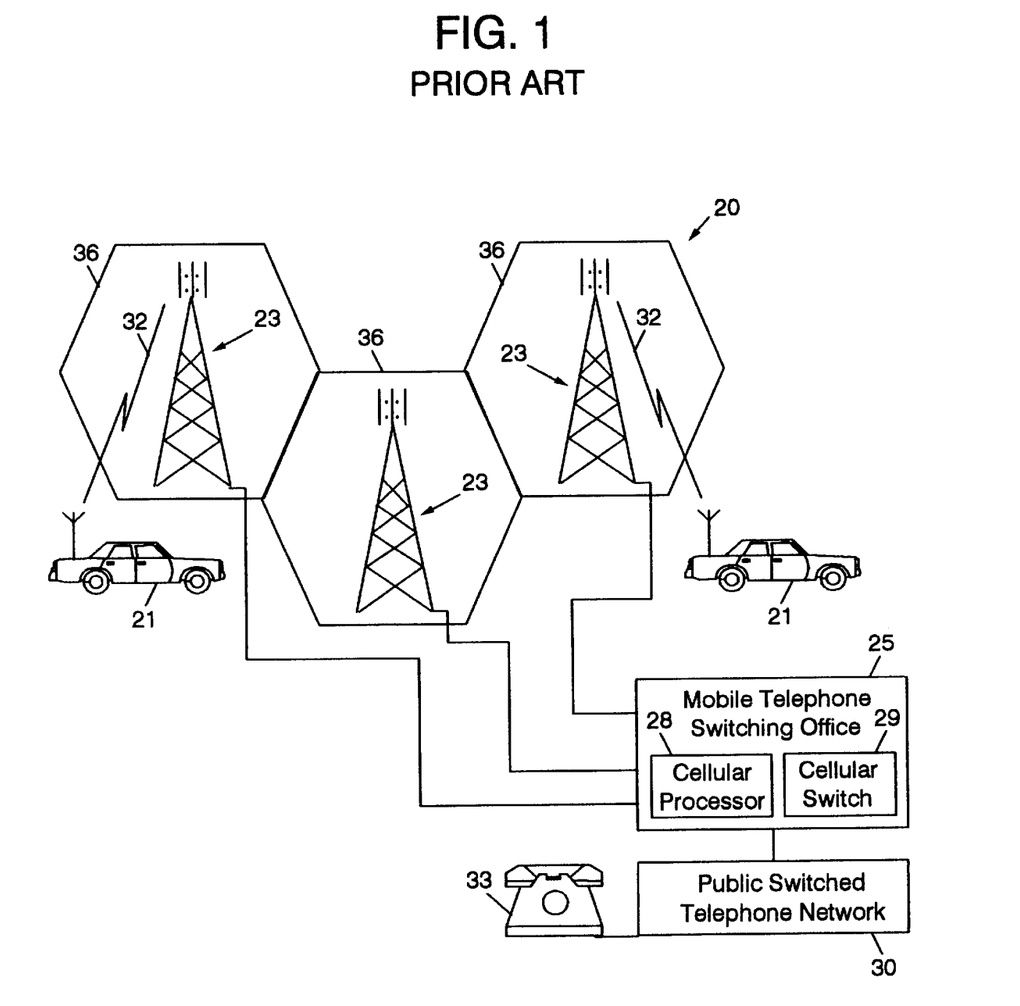
FIG. 1 schematically illustrates a terrestrial cellular radiotelephone communications as in the prior art.

As illustrated in FIG. 1, a cellular radiotelephone communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of radiotelephones and more than one MTSO. Each cell will have allocated to it one or more dedicated control channels and one or more voice channels. Through the cellular network 20, a duplex radio communication link 32 may be effected between two mobile stations 21 or, between a radiotelephone 21 and a landline telephone user 33. The function of the base station 23 is commonly to handle the radio communication with the mobile station 21. In this capacity, the base station 23 functions chiefly as a relay station for data and voice signals.

Figure 2:
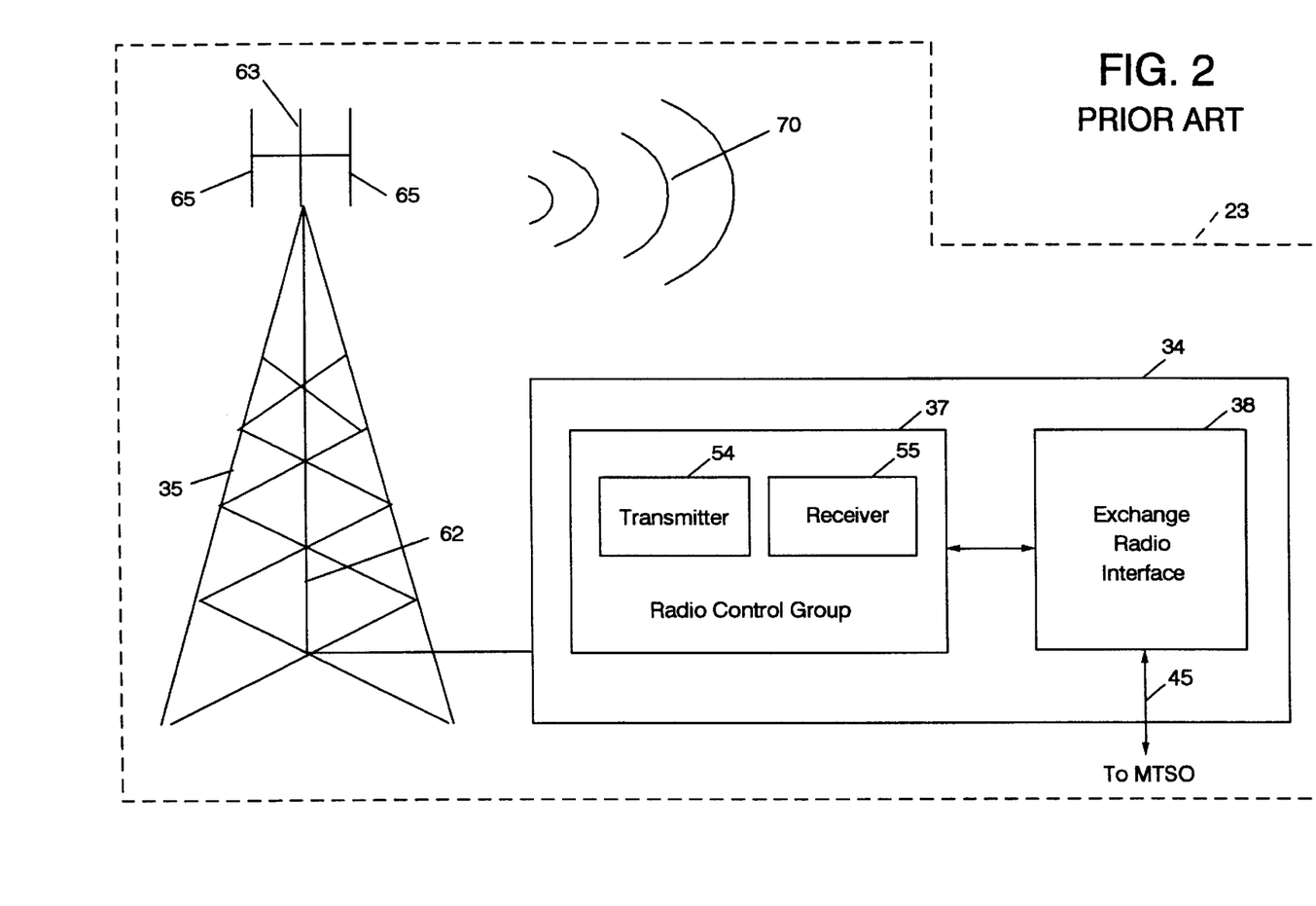
FIG. 2 schematically illustrates a cellular radiotelephone base station as in the prior art.

A typical base station 23 as in the prior art is schematically illustrated in FIG. 2. The base station 23 includes a control unit 34 and an antenna tower 35. The control unit 34 includes the radio control group 37, or RCG, and an exchange radio interface (ERI) 38. The ERI 38 receives data from the RCG 37 and transfers it to the MTSO 25 on a dedicated link 45, and receives data from the MTSO 25 and sends it the RCG 37 for subsequent transmission to a radiotelephone 21. The radio control group 37 includes electronic equipment necessary to effect radio communications, including one or more transmitters 54 and receivers 55. The transmitters 54 and the receivers 55 transmit and receive radiotelephone communications signals 70 via antennas 63, 65, which are desirably mounted at some distance above the ground.

Figure 3:
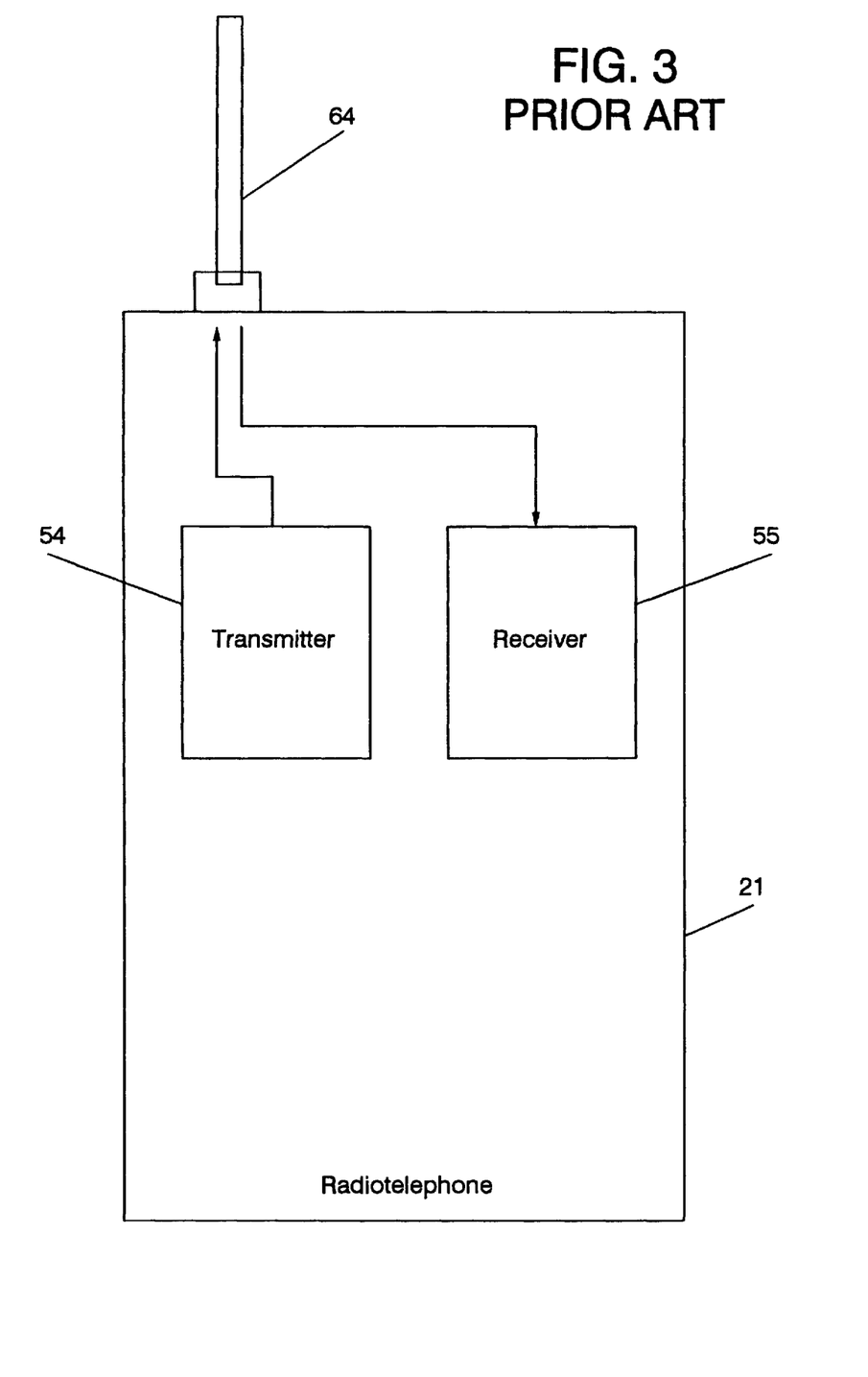
FIG. 3 schematically illustrates a radiotelephone as in the prior art.

A typical radiotelephone 21 as in the prior art is illustrated in FIG. 3. The radiotelephone 21 typically includes many of same kind of communications components found at a base station 23, such as a transmitter 54 and receiver 55. Typically, the transmitter 54 and receiver 55 share a common transmit/receive antenna 64, which may be mounted on the radiotelephone 21 or on other structures such as vehicles. Typically, the antenna 64 is an omni-directional antenna which, although having generally low gain in comparison to directional antennas, allows the user to operate the radiotelephone 21 at convenient orientations. Other components of a typical radiotelephone 21, such as a controller, keypad, display, microphone and speaker are not shown in FIG. 3.

Figure 4:
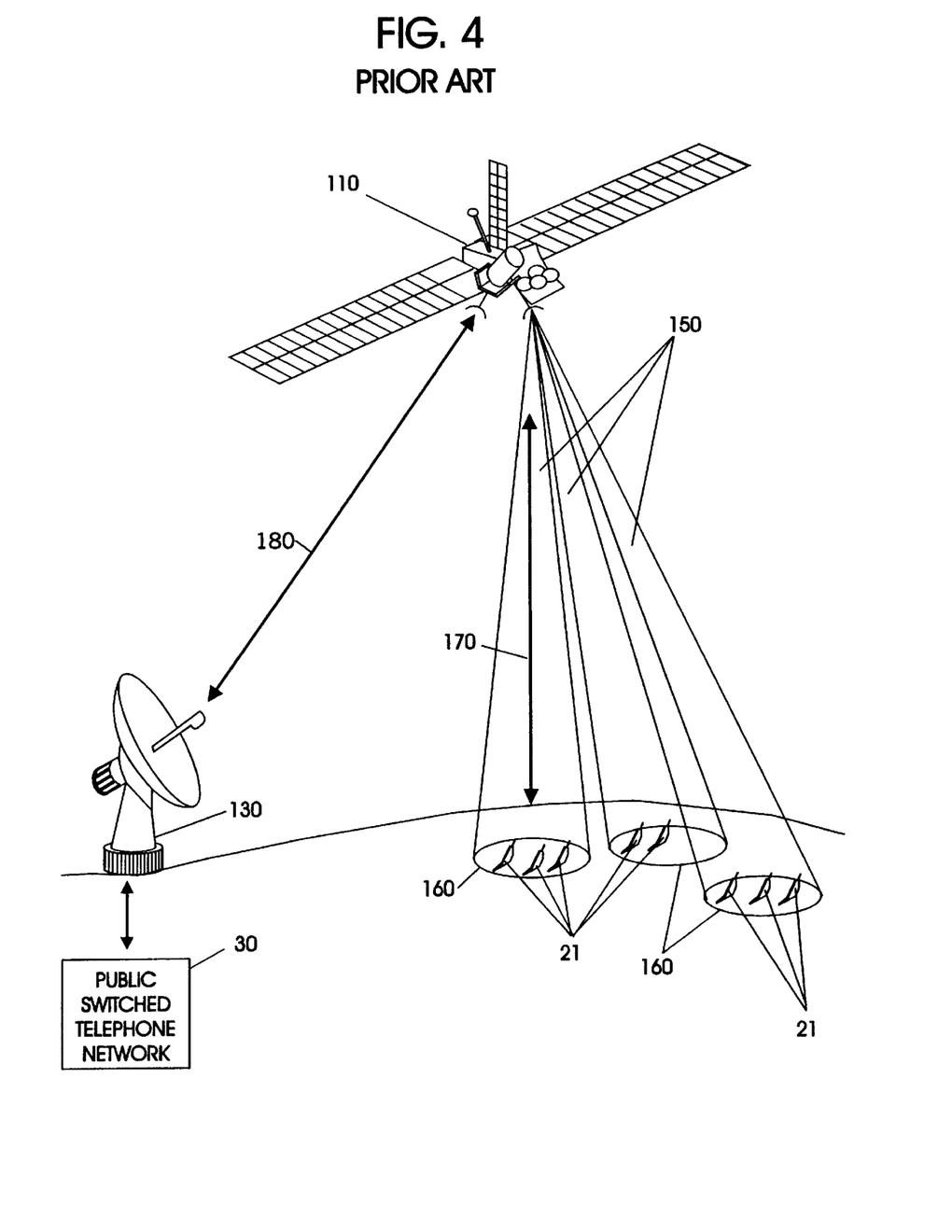
FIG. 4 schematically illustrates a satellite radiotelephone communications system as in the prior art.

As illustrated in FIG. 4, satellites may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system 100 typically includes one or more satellites 110 which serve as relays or transponders between one or more earth stations 130 and radiotelephones 120. The satellite communicates radiotelephone communications over duplex links 170, 180 to radiotelephones 21 and the earth station 130. The earth station may in turn be connected to a public switched telephone network 30, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown, the satellite may be designed such that it produces multiple ninimally-overlapping beams 150, each serving distinct geographical coverage areas 160 in the system's service region. Thus, a cellular architecture similar to that used in terrestrial cellular radiotelephone systems may be provided.

Traditional analog radiotelephone systems typically employ frequency division multiple access (FDMA), wherein a radiotelephone communications channel includes one or more carrier frequency bands which are dedicated to a user for the duration of a particular session or call. To provide greater channel capacity and to more efficiently use the radio spectrum, however, many conventional radiotelephone systems operate using time division multiple access (TDMA) or code division multiple access (CDMA).

Communications in a TDMA system occur over a series of sequential time slots on each carrier frequency band, with individual users allocated one or more time slots on a band. Each user communicates with the base station using bursts of digital data transmitted during the user's assigned time slots. Instead of assigning time slots to each user, CDMA systems assign users one or more unique spreading codes, each of which corresponds to a coded modulation sequence used in transmitting radiotelephone communications signals. The coded modulation "spreads" the transmitted signals in the frequency domain, and a receiving station uses the same code to "despread" the coded signals and recover the transmitted communications. Thus, in a typical TDMA system, a radiotelephone communications channel includes one or more time slots allocated on one or more carrier frequency bands, while in a typical CDMA system, a channel includes a spreading code/carrier frequency combination.

Figure 5:
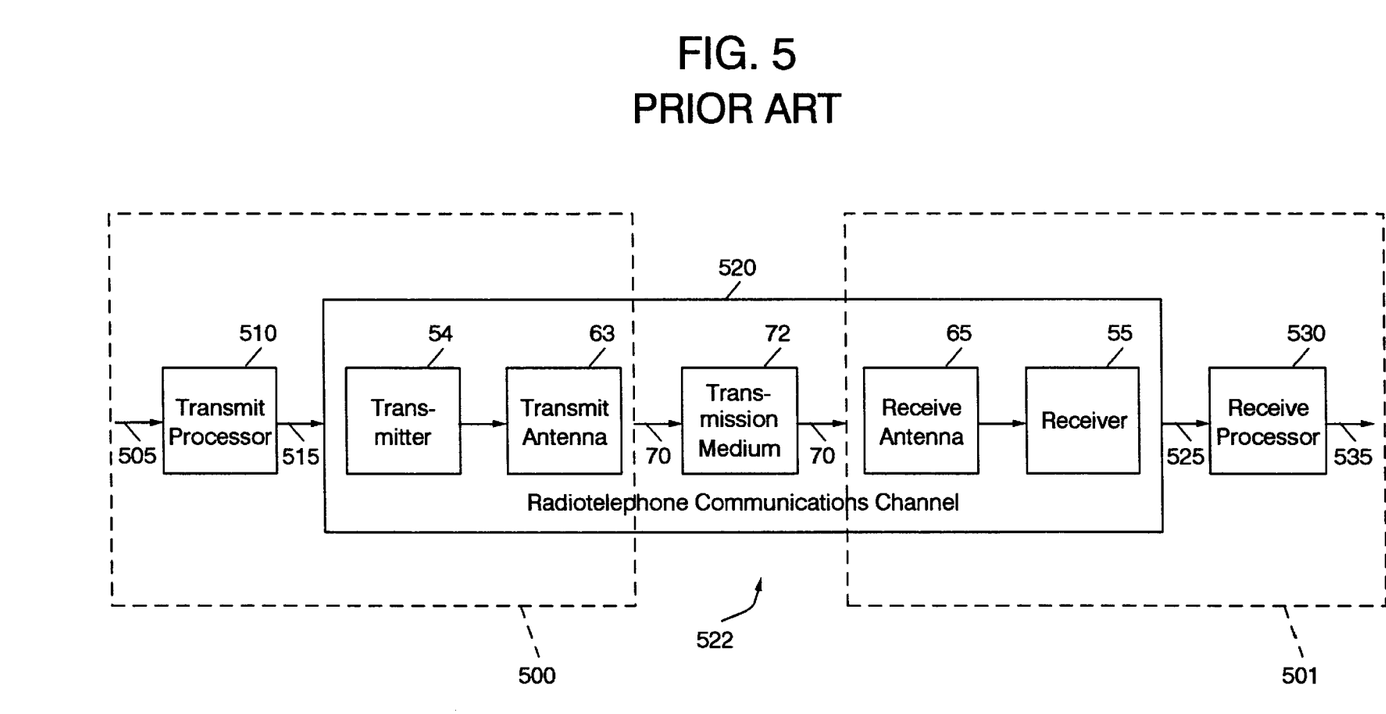
FIG. 5 schematically illustrates radiotelephone communications over a radiotelephone communications channel as in the prior art.

As illustrated in FIG. 5, a transmitting station 500 typically includes a transmit processor 510 which processes radiotelephone communications 505 to produce a communications symbol sequence 515 corresponding to the radiotelephone communications 505. This sequence is typically is communicated over a radiotelephone communications channel 520, producing a sequence of communications symbol data 525 at a receiving station 501. The receiving station 501 typically includes a receive processor 530 which processes the data sequence 525 produced by the radiotelephone communications channel 520 to recover radiotelephone communications 635. Those skilled in the art will understand that transmitting station 500 and receiving station 501 may be base stations, radiotelephones, satellites, earth stations or similar radiotelephone communications stations.

Those skilled in the art will also appreciate that the radiotelephone communications channel 520 has an associated transfer characteristic 522 which represents a relationship between an input to the channel 520 and an output from the channel 520, typically expressed as a complex gain having magnitude and phase components.

Elements of the radiotelephone communications channel 520 affect the transfer characteristic 522. These elements include the signal transmission medium 72, i.e., the atmospheric signal path across which radiotelephone communications signals 70 are transmitted, which may introduce fading and interference into the radiotelephone communications signals 70. The fading may include long-term fading due to variations in terrain along the signal propagation path, as well as short-term multipath fading due to reflections from features such as buildings which cause fluctuations in received signal strength and other distortions at a receiving station. Mobile terrestrial radiotelephone communications are particularly susceptible to short-term multipath fading because the signal pathways tend to be close to the ground. Satellite-to-ground communications may also be susceptible to interference from surrounding man-made and natural features, as well as other types of signal losses, such as those caused by the Doppler shift associated with signals communicated to and from a communications satellite moving at a high speed with respect to the radiotelephones it serves. Other elements of the channel 520 which may affect the transfer characteristic 522 include transmitting and receiving components commonly found in base stations, satellites, earth stations, radiotelephones and the like, such as transmitters 54, transmit antennas 63, receive antennas 65, receivers 55.

Various techniques are conventionally employed to deal with the propagation losses, including diversity reception, modulation schemes, signal coding and pilot tone systems. Spatial diversity reception involves the use of multiple receiving antennas spaced a distance apart so that signals are received over more than one signal path. As signals from diverse paths typically exhibit uncorrelated fading, they may be combined in the receiver to ameliorate the effects of fading. Similarly, radiotelephone communications signals may be transmitted and received using diverse polarizations and combined at the receiver to take advantage of the low correlation of fading between signals of differing polarizations. Despite the theoretical advantages of these types of diversity reception, however, sufficient diversity gain may not be possible because of limitations on antenna placement.

The modulation/demodulation scheme implemented in the transmitter 54 and receiver 55 can also affect the performance of the radiotelephone communications channel 520. Some modulation schemes provide better performance in a fading environment, but conventional modulation techniques generally provide poor performance without the use of coding. Several coding schemes have been proposed to reduce the effects of fading, but these coding schemes tend to require coherent detection which may be difficult in applications where there are high levels of interference. In addition, these coding techniques may require complex signal processing to recover the radiotelephone communications, creating processing delays which may be unacceptable in certain applications.

Another technique for compensating for the effects of fading in a radiotelephone is to transmit a known pilot signal or tone over at a certain frequency as part of the radiotelephone communications signal. The pilot tone is received by the receiver 55 and used to determine the transfer characteristic of the radiotelephone communications channel 520. Knowing the channel transfer characteristic, the receiver may compensate for the distortion induced by the channel during the process of estimating the symbols being transmitted over the channel.

However, a portion of the transmit spectrum typically must be allocated to the pilot tone, a task which may be problematic. If the tone is placed at a frequency band edge, it can suffer distortion and interference from adjacent frequency bands. If the tone is placed in the center of the frequency band, it may limit the choice of modulation schemes to those schemes which provide for a spectral notch around the carrier band center frequency.

Figure 6:
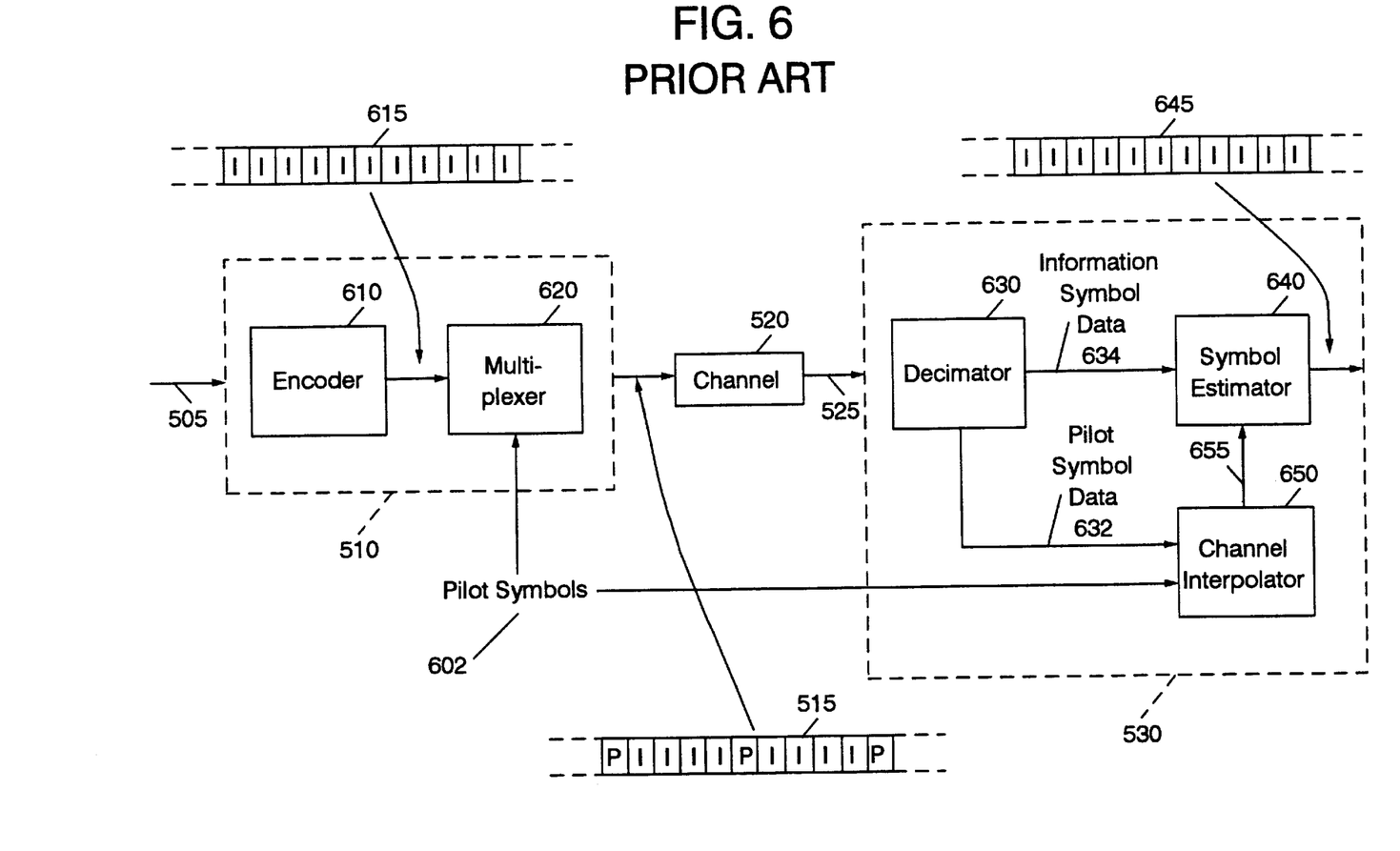
FIG. 6 schematically illustrates pilot-symbol-assisted radiotelephone communications as in the prior art.

As illustrated in FIG. 6, an alternative to using a pilot tone is to use its time domain analog, i.e., a sequence of pilot symbols which is interleaved with information symbols which carry voice, data and other information, a technique which is often referred to as pilot symbol assisted modulation (PSAM). An encoder 610 typically encodes the radiotelephone communications 505 to produce a sequence of information symbols 615. A multiplexer 620 interleaves this sequence with a sequence of predetermined pilot symbols 602 to produce an interleaved PSAM communications symbol sequence 515. The PSAM communications symbol sequence 515 is communicated over the radiotelephone communications channel 520, producing a data sequence 525 at the receiving station. A decimator 630 separates pilot symbol data 632 corresponding to the transmitted pilot symbols from information symbol data 634 corresponding to the transmitted information symbols. The pilot symbol data 634 is passed through an interpolator 650, typically a lowpass filter, which estimates a transfer characteristic of the radiotelephone communications channel 520. The estimated transfer characteristic is then used in a symbol estimator 640 to compensate estimation of the information symbols in response to distortion induced by the radiotelephone communications channel 520. Analyses of pilot symbol assisted modulation are provided in "TCMP—A Modulation and Coding Strategy for Rician Fading Channels", by Moher et al., IEEE Journal on Selected Areas in Communications, vol. 7, No. 9, December 1989, and in "An Analysis of Pilot Symbol Assisted Modulation for Rayleigh Fading Channels", by Cavers, IEEE Transactions on Vehicular Technology, vol. 40, no. 4, November 1991.

Pilot symbol assisted modulation can provide improved immunity to fading, but may have several drawbacks. In general, the error probability of symbol estimates tends to increase for those symbols which are the furthest distance from the pilot symbols in the symbol sequence, contributing to the overall bit error rate for radiotelephone communications communicated over the channel. In order to reduce the bit error rate, pilot symbols may be inserted in the symbol sequence at a smaller intervals to reduce the separation between the pilot symbols and to increase the accuracy of the estimated channel transfer characteristic. As pilot symbols generally have no information content, however, increasing the frequency of pilot symbols in the transmitted symbol sequence can reduce the potential information capacity of the channel, which may in turn reduce the number of channels which can provided in the system and the quality of each channel. Adding pilot symbols may also reduce power efficiency by wasting transmit power in non-informational symbols. In addition, the optimal interpolating filter which is generally needed to recognize the full benefit of PSAM may have hundreds of taps and may present practical difficulties in implementation.

SUMMARY OF THE INVENTION

In light of the foregoing, it is an object of the present invention to provide systems and methods for communicating radiotelephone communications over a radiotelephone communications channel which compensate for fading and other interference effects associated with the radiotelephone communications channel.

It is another object of the present invention to provide systems and methods for communicating radiotelephone communications over a radiotelephone communications channel which achieve a desired bit error rate while requiring less information capacity reduction than pilot symbol assisted modulation (PSAM) and other conventional channel compensation techniques.

It is another object of the present invention to provide systems and methods for communicating radiotelephone communications over a radiotelephone communications channel which may achieve a desired bit error rate with greater power efficiency than pilot symbol assisted modulation (PSAM) and other conventional channel compensation techniques which achieve a comparable error rate.

It is another object of the present invention to provide systems and methods for communicating radiotelephone communications over a radiotelephone communications channel which may achieve a desired bit error rate without requiring a complex optimal estimating filter.

These objects, advantages and features are provided in the present invention by radiotelephone communications systems and methods which employ a data-augmented, pilot-symbol-assisted estimate of a radiotelephone communications channel transfer characteristic to decode radiotelephone communications from a data sequence representing radiotelephone communications received over the channel. Radiotelephone communications are encoded as a PSAM communications symbol sequence which includes a sequence of information symbols, corresponding to the radiotelephone communications, interleaved with a plurality of predetermined pilot symbols. The transfer characteristic of the radiotelephone communications channel is estimated from the predetermined pilot symbols and a data sequence including data corresponding to both the pilot symbols and the communication symbols, thus resulting in a data-augmented estimation of the channel transfer characteristic. The estimation of the channel characteristic preferably includes an iterative estimation of information symbols and the channel characteristic, wherein estimates of information symbols are generated from previously estimated information symbols, and newly estimated information symbols are used to generate new estimates of the channel transfer characteristic.

By using information symbol data to augment pilot symbol data in estimating the channel transfer characteristic, the present invention can provide a lower bit error rate than a pure pilot symbol based estimate for a given frequency of pilot symbols in the communication symbol sequence. Accordingly, a desired bit error rate may be achieved with greater information and power efficiency because less information capacity and power is wasted in transmitting non-informational pilot symbols. In addition, a desired bit error rate may be achieved without the use of a complex optimal transfer characteristic estimating filter.

In particular, a radiotelephone communications system according to the present invention processes radiotelephone communications to produce a PSAM communications symbol sequence, the PSAM communications symbol sequence including a plurality of predetermined pilot symbols interleaved with a plurality of information symbols representing radiotelephone communications. The PSAM communications symbol sequence are communicated over a radiotelephone communications channel having a transfer characteristic, thereby producing a sequence of communications symbol data representing the communicated sequence of communication symbols. Pilot symbol data, corresponding to pilot symbols, and information symbol data, corresponding to information symbols, are identified in the sequence of communications symbol data. An estimate of the transfer characteristic of the radiotelephone communications channel is generated from the pilot symbol data and the information symbol data. Estimates of information symbols are generated from the corresponding information symbol data and the estimate of the transfer characteristic. Radiotelephone communications are decoded from the generated estimates of the information symbols.

Generating an estimate of the transfer characteristic preferably includes generating an estimate of a transfer characteristic of the radiotelephone communications channel from the pilot symbol data, as in conventional PSAM. Additional estimates of the transfer characteristic may be generated by identifying a group of information symbol data corresponding to a group of information symbols, generating estimates of the group of identified information symbols from the group of information symbol data and a previously generated estimate of the radiotelephone communications channel transfer characteristic, and generating a new estimate of the transfer characteristic from the pilot symbol data, the information symbol data, and previously generated estimates of information symbols. In this manner, estimates of information symbols may be generated by iterative estimation of the transfer characteristic augmented by previous estimates of information symbols.

The group of information symbol data identified may include a group of information symbol data corresponding to a group of information symbols adjacent pilot symbols in the sequence of symbols or, in later iterations, a group of information symbols data corresponding to a group of information symbols adjacent previously estimated information symbols. The identified group may also be a group of information symbol data corresponding to a group of information symbols in the sequence of symbols for which estimates of the group of information symbols, generated from the group of information symbol data and a previous estimate of the radiotelephone communications channel transfer characteristic, have an associated error probability less than a predetermined threshold.

BRIEF DESCRIPTION OF THE DRAWINDS

Some of the objects and advantages of the present invention having been stated, others will be more fully understood from the detailed description that follows and by reference to the accompanying drawings in which.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 7:
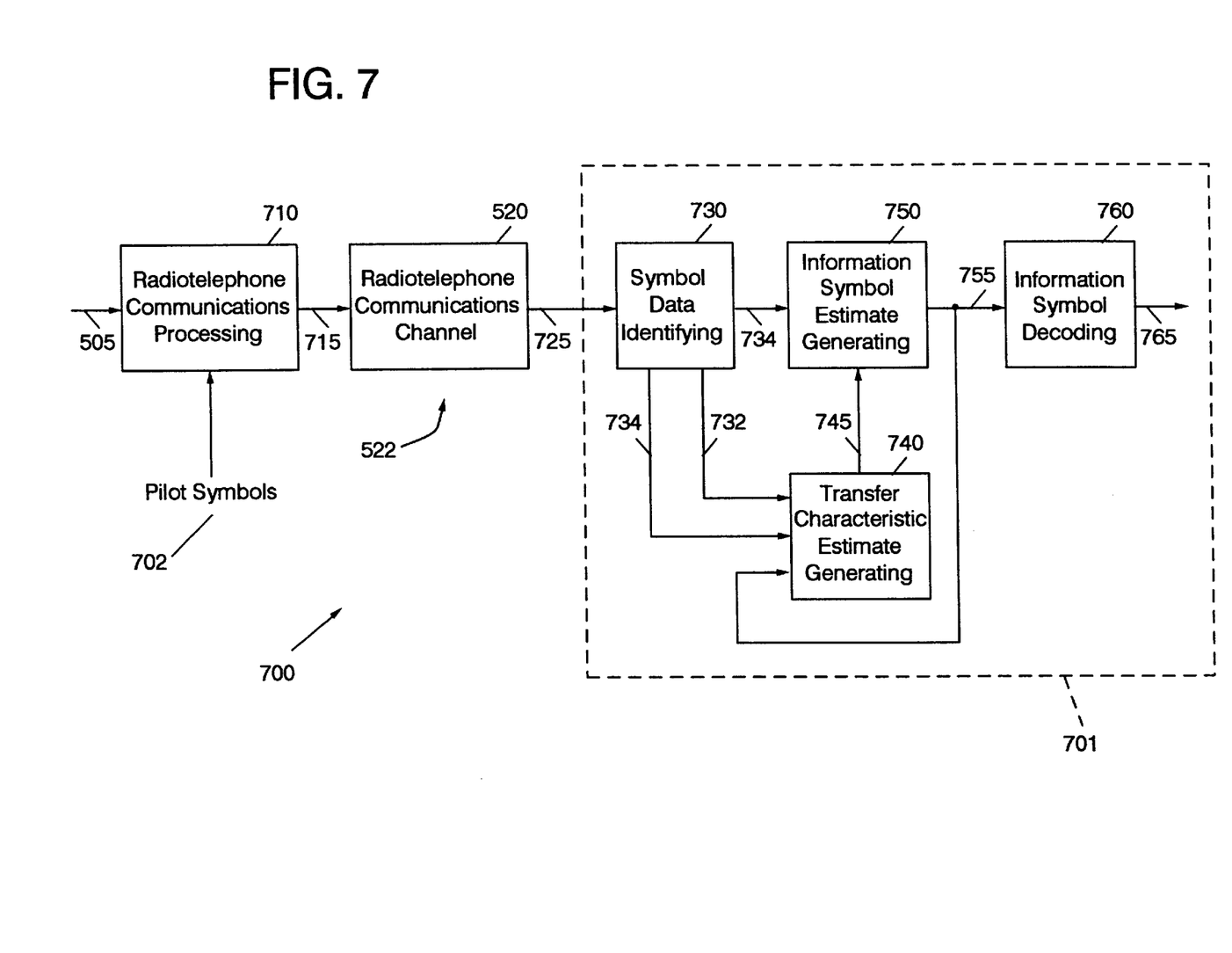
FIG. 7 schematically illustrates data-augmented, pilot-symbolassisted radiotelephone communications according to the present invention.

As illustrated in FIG. 7, a radiotelephone communications system 700 according to the present invention includes radiotelephone communications processing means 710, a radiotelephone communications channel 520, and an apparatus 701 for recovering PSAM radiotelephone communications which includes symbol data identifying means 730, transfer characteristic estimate generating means 740, information symbol estimate generating means 750, and information symbol decoding means 760. The radiotelephone communications processing means 710 produces a PSAM communications symbol sequence 715 which is communicated over the radiotelephone communications channel 520 to produce a sequence of communications symbol data 725 at the apparatus 701. Symbol data identifying means 730 identifies pilot symbol data 732 and information symbol data 734 in the data sequence 725, and information symbol estimate generating means 750 generates information symbol estimates 755 corresponding to information symbols in the original PSAM communications symbol sequence 715, based on transfer characteristic estimates 745 generated by transfer characteristic estimate generating means 740. Decoding means 760 decodes radiotelephone communications 765 from the information symbol estimates 755. Those skilled in the art will understand that the apparatus for recovering PSAM radiotelephone communications 701 may be included in a radiotelephone, base station, satellite, earth station, or similar radiotelephone communications station.

Figure 8:
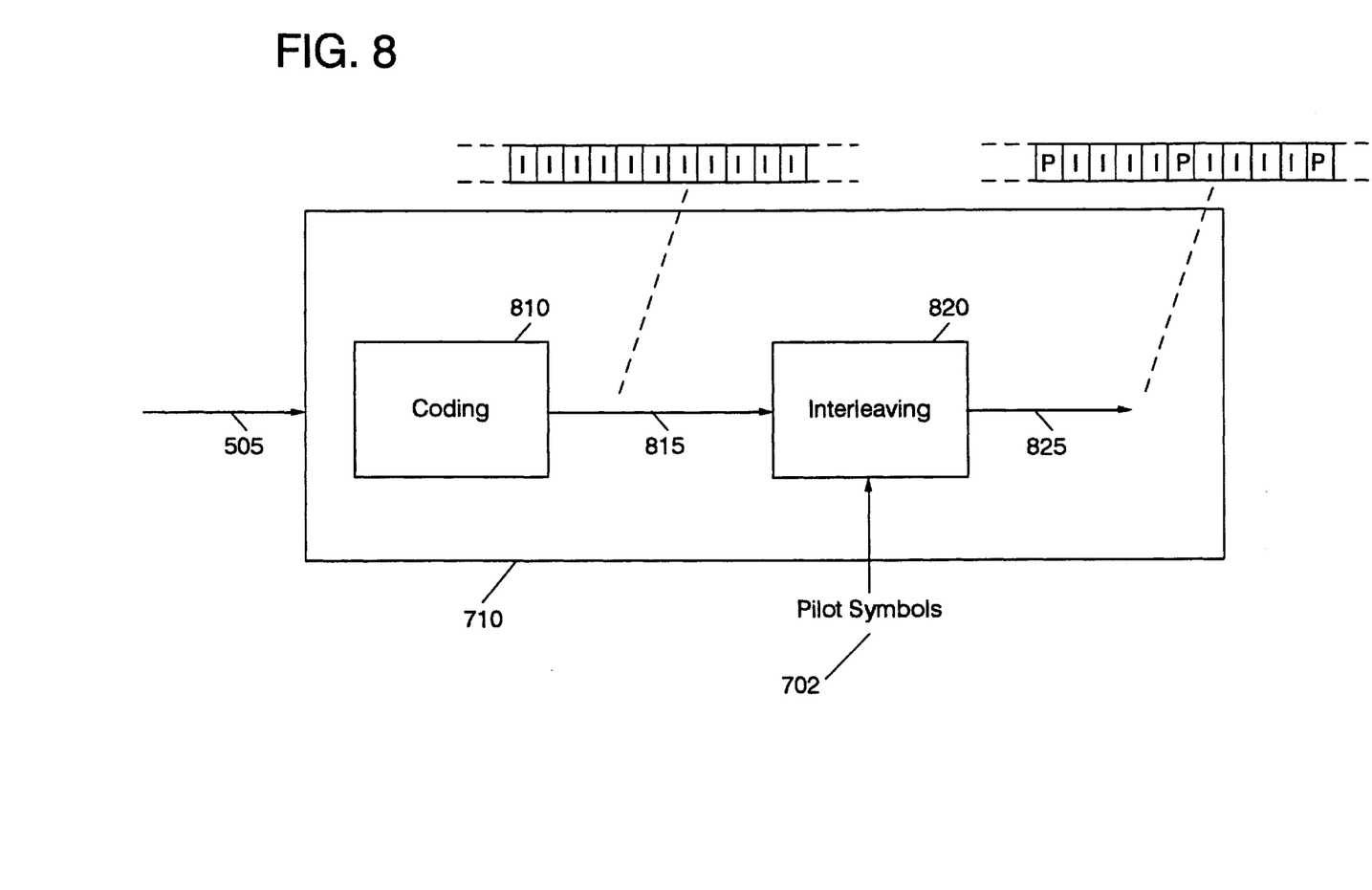
FIG. 8 schematically illustrates generation of an interleaved PSAM communications symbol sequence according to the present invention.

Radiotelephone communications processing means 710 processes radiotelephone communications 705 to produce a PSAM communications symbol sequence 715 including a plurality of predetermined pilot symbols P interleaved with a plurality of information symbols I corresponding to the radiotelephone communications 705. Those skilled in the art will understand that the radiotelephone communications 705 may include voice, data or other information, and may take the form of analog signals, digital signals or combinations thereof. As shown in FIG. 8, the radiotelephone communications 705 may be processed in coding means 810, producing a sequence 815 of information symbols I representing the radiotelephone communications 705. Coding means 810 may encode the radiotelephone communications 705 according to any of a number of coding schemes, such as binary phase shift keying, quadrature phase shift keying, trellis coding and the like, and the information symbols I may take several forms, including single bit symbols and multi-bit symbol formats.

The information symbols I in sequence 815 produced by coding means 810 may be interleaved with predetermined pilot symbols P by interleaving means 820, producing a PSAM communications symbol sequence 715 which includes the information symbol sequence 815 interleaved with predetermined pilot symbols P. The predetermined pilot symbols may, for example, be all the same, form a fixed sequence, or have randomly assigned values. Pilot symbols P may be interleaved in the sequence at a fixed interval or according to other interleaving schemes, such as adaptive spacing. Those skilled in the art will appreciate that radiotelephone communications processing means 710 may include special purpose analog or digital hardware, software running on general purpose hardware, or combinations thereof.

The PSAM communications symbol sequence 715 produced by the processing means 710 of FIG. 7 is communicated over the radiotelephone communications channel 520, producing a communications symbol data sequence 725. The radiotelephone communications channel 520 may include signal paths over which the symbol sequence is communicated, in particular, the atmospheric transmission media through which radio frequency signals representing the PSAM communications symbol sequence 715 are transmitted. The radiotelephone communications channel 520 may also include components such as modulators, transmitters, antennas, receivers, demodulators, signal processors, and other communications components which provide analog and digital signal paths through which the PSAM communications symbol sequence 715 may be communicated, using various signal forms. Those skilled in the art will appreciate that these communications components may include special purpose analog and digital hardware, software running on general purpose processors and combinations thereof.

The radiotelephone communications channel 520 has an associated transfer characteristic 522, representing a relationship between the communications data 725 produced by the channel 520 and the PSAM communications symbol sequence 715 input into the channel 520. The channel transfer characteristic 522 preferably includes the complex gain, i.e., the relative magnitude and phase of the output of radiotelephone channel 520 with respect to the input of the channel 520. Those skilled in the art will appreciate that the radiotelephone communications channel 520 may include various sources of noise, interference and distortion, such as reflected radio waves, electromagnetic disturbances and interfering signals from other communications channels using the same media, which affect the gain of the radiotelephone communications channel 520 by inducing signal loss, phase distortion and the like.

The symbol data identifying means 730 of FIG. 7 identifies pilot symbol data 732, corresponding to predetermined pilot symbols P in the PSAM communications symbol sequence 715, and information symbol data 734, corresponding to information symbols I in the PSAM communications symbol sequence 715, in the sequence of communications data 725. Preferably, the symbol data identifying means 730 decimates the communications symbol data sequence 725, separating the pilot symbol data 732 from the information symbol data 734.

Figure 9:
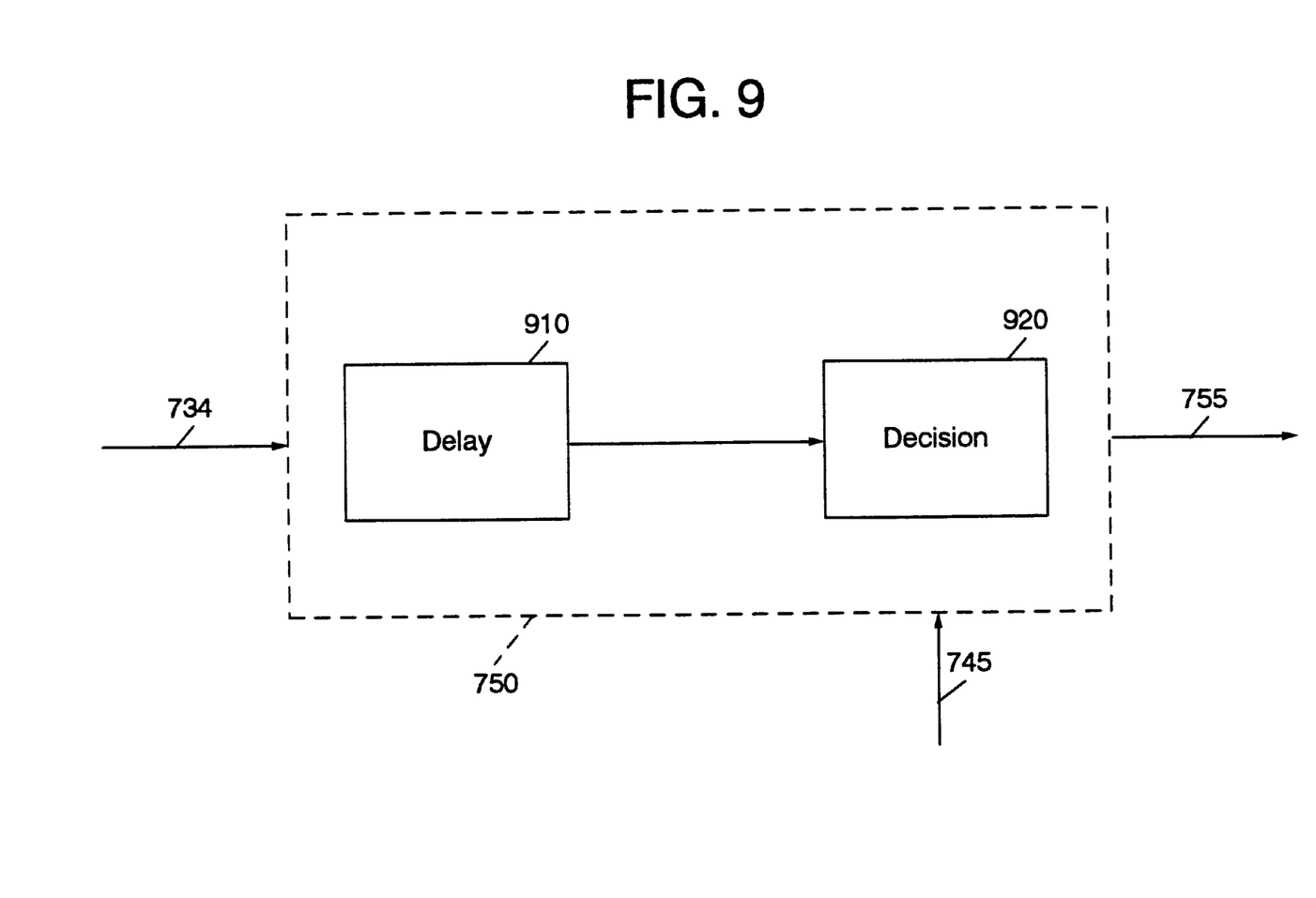
FIG. 9 schematically illustrates information symbol estimate generating according to the present invention.

The information symbol estimate generating means 750 generates information symbol estimates 755 corresponding to the information symbols I in the PSAM communications symbol sequence 715 produced by processing means 710, from the information symbol data 734 and a transfer characteristic estimate 745 of the radiotelephone communications channel 520 generated by a transfer characteristic estimate generating means 740. As illustrated in FIG. 9, information symbol estimate generating means 750 may, for example, include decision means 920 for determining whether information symbol data 734 corresponding to a particular information symbol represents one of a number of discrete symbol values. The decision boundaries used in the decision means 920 may be modified based on the transfer characteristic estimate 745, generated by transfer characteristic estimate generating means 740. Information symbol estimate generating means 750 may also include a delay means 910 which compensates for delay associated with generating a transfer characteristic estimate 745 in transfer characteristic estimate generating means 740.

The decoding means 760 of FIG. 7 decodes radiotelephone communications 765 from the information symbol estimates 755. Those skilled in the art will understand that decoding means 760 may include means for decoding the information symbol estimates 755 which are inverse to the means employed in the coding means 810 of FIG. 8, thus recovering radiotelephone communications 765 in the same form as the radiotelephone communications 705 input into the coding means 810. However, those skilled in the art will also understand that other coding schemes, format conversions and other signal and data processing may be used with the present invention which result in production of received radiotelephone communications 765 having format and content different from the radiotelephone communications 705 input at coding means 810. For example, input radiotelephone communications 705 in the form of analog voice or instrumentation signals may ultimately be recovered as radiotelephone communications 765 in the form of digital data having a compressed format.

The transfer characteristic estimate generating means 740 of FIG. 7 estimates the transfer characteristic 522 of the radiotelephone communications channel 520 from the pilot symbol data 732, the information symbol data 734, and the predetermined pilot symbols 702, thus implementing a data-augmented, pilot-symbol-assisted estimation of the transfer characteristic 522. Preferably, the estimated transfer characteristic 745 is iteratively generated from pilot symbol data 732, information symbol data 734, predetermined pilot symbols 702 and previously generated information symbol estimates 755. Those skilled in the art will understand that transfer characteristic estimate generating means 740, as well as symbol data identifying means 730, information symbol estimate generating means 750 and decoding means 760, may include special purpose analog or digital hardware, software running on general purpose hardware, or combinations thereof. Preferably, all may be implemented in software running on a general or special purpose processor.

Figure 10:
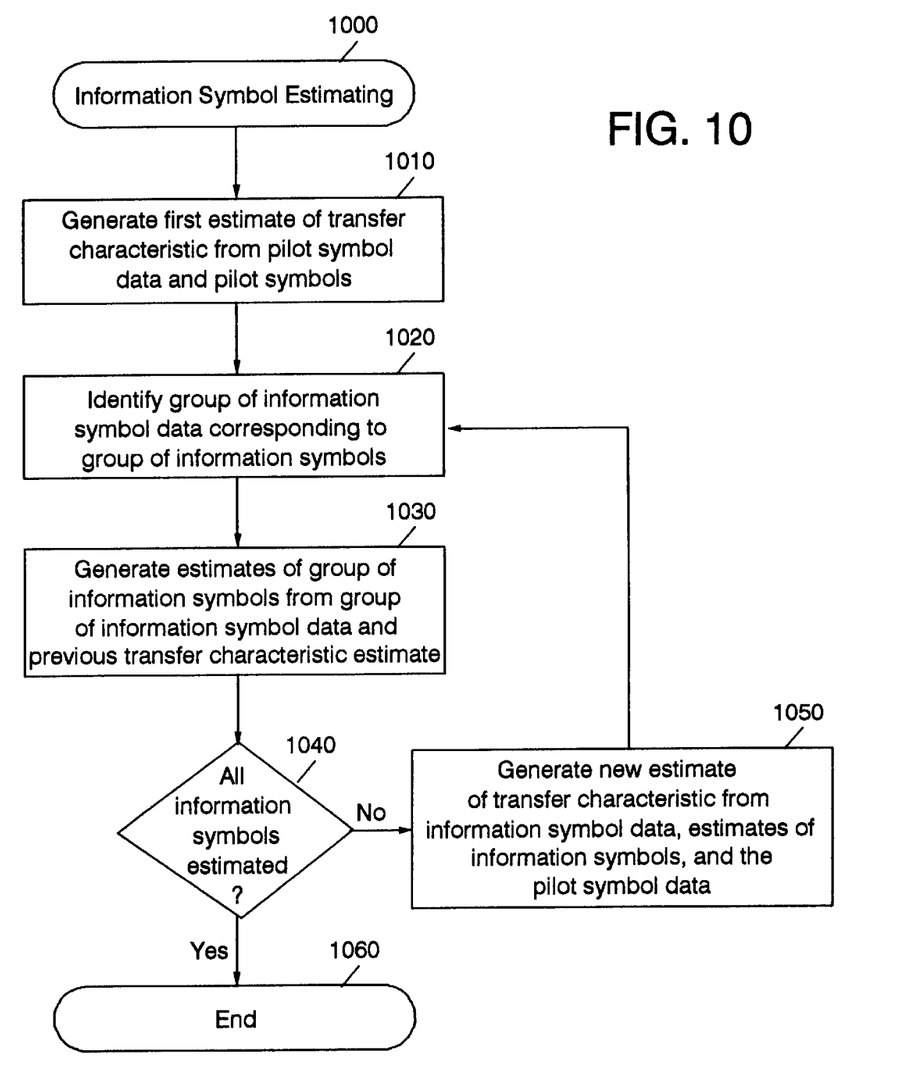
FIG. 10 illustrates operations for iterative generating of a radiotelephone channel transfer characteristic and information symbols according to the present invention.

Detailed operations for generating information symbol estimates 755 based on an iteratively generated transfer characteristic estimate 745 are illustrated in detail in FIG. 10 (Block 1000). A first estimate of the transfer characteristic is generated from the pilot symbol data 732 and the predetermined pilot symbols 702 (Block 1010), as typically might be done under conventional pilot-symbol-assisted estimation techniques. A group of information symbol data corresponding to a group information symbols in the PSAM communications symbol sequence 715 is then identified (Block 1020). Estimates 755 of this group of information symbols are then generated by information symbol estimate generating means 740, based on the first estimate of the transfer characteristic (Block 1030). If all of the desired information symbol estimates have yet to be obtained (Block 1040), a new transfer characteristic estimate is then generated from the pilot symbol data, the information symbol data, and the information symbol estimates (Block 1050). This results in another group of information symbol data being identified (Block 1020) and estimated (Block 1030). The operations of Blocks 1130–1150 are repeated until all desired information symbol estimates are obtained (Block 1060).

Figure 11A:
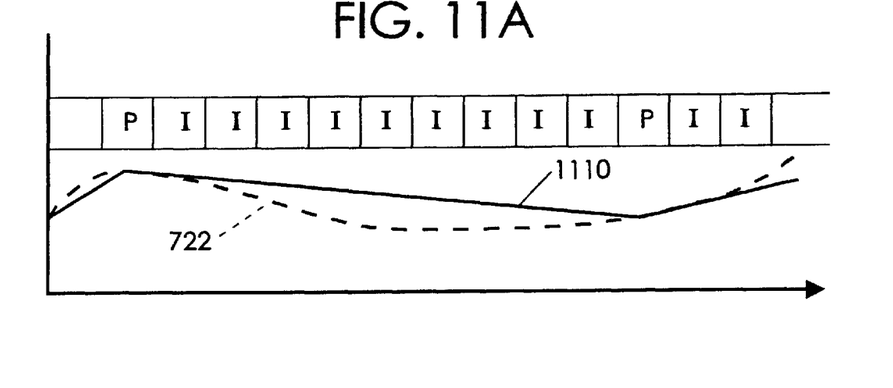
FIGS. 11A–11C illustrates data-augmented, pilot-symbol-assisted estimation of a radiotelephone communications channel transfer characteristic.

By this procedure, information symbol estimates 745 are generated using an iterative estimation of the transfer characteristic 522, in which each succeeding estimate 745 of the transfer characteristic 522 is augmented by previous estimates 755 of information symbols. In part because of the discrete-valued nature of the information symbols, iterative estimation according to the present invention uses higher-confidence estimates of certain information symbols in the PSAM communications symbol sequence 715 to obtain more accurate estimates of lower-confidence symbols in the sequence 715. In particular, as illustrated in FIG. 11A, estimates of information symbols which are adjacent pilot symbols in the PSAM communications symbol sequence 715 obtained from on a pilot-symbol based estimate 1110 of the transfer characteristic 522 generally have a lower error probability than estimates for symbols more distant from the pilot symbols, because the transfer characteristic estimate 1110 is generally more accurate near the pilot symbols.

Figure 11B:
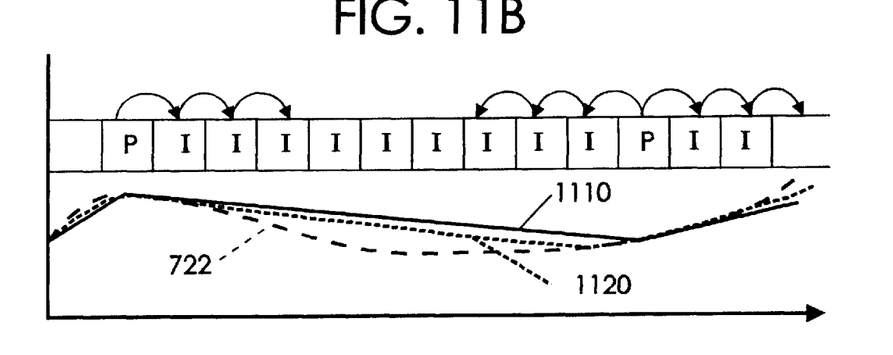
Figure 11C:
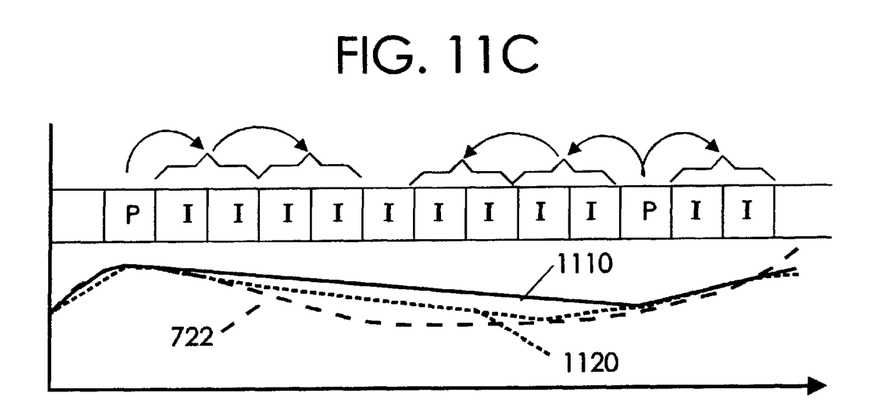

The information from these higher confidence adjacent symbol estimates, however, may be used to generate a new estimate 1120 the transfer characteristic 522, as illustrated in FIG. 11B. The new estimate 1120 may then be used to generate more accurate estimates of remaining information symbols. Preferably, the group of information symbol data identified in each iteration of FIG. 10 includes information symbol data corresponding to information symbols adjacent to predetermined pilot symbols or previously estimated information symbols in the PSAM communications symbol sequence 715. Iterative estimation of the information symbols may thus proceed along the lines suggested by the arrows of FIG. 11B. The group of identified symbols in each iteration may also include subgroups of adjacent information symbols in the sequence 715, as indicated in FIG. 11C.

In addition to identifying information symbol data based on the location of the corresponding information symbols in the sequence 715, the information symbol data may be identified with respect to quality criteria associated with the corresponding information symbol estimates, such as maximum bit error probability. For example, each identified group may include information symbol data corresponding to information symbols for which information symbol estimates, based on the current transfer characteristic estimate, have an associated bit error probability less than a predetermined threshold.

The radiotelephone processing means 710, the transfer characteristic estimate generating means 740 and the information symbol estimate generating means 750 may also operate in such a way as to achieve a desired bit error rate in the information symbol estimates 755 with respect to the information symbols in the PSAM communications symbol sequence 715, based on assumptions about the transfer characteristic 522 of the radiotelephone communications channel 520. For example, the frequency with which the pilot symbols are interleaved in the PSAM communications symbol sequence 715 may be chosen to achieve a desired bit error rate given estimation criteria used in information symbol estimate generating means 750 and transfer characteristic estimate generating means 740, and assuming the radiotelephone communications channel 520 imparts additive white Gaussian noise.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A pilot symbol assisted modulation (PSAM) radiotelephone communications method, comprising the steps of:

processing radiotelephone communications to produce a PSAM communications symbol sequence, the PSAM communications symbol sequence including a plurality of predetermined pilot symbols interleaved with a plurality of information symbols representing the radiotelephone communications;

communicating the PSAM communications symbol sequence over a radiotelephone communications channel having a transfer characteristic to thereby produce a sequence of communications symbol data representing the communicated sequence of communication symbols;

identifying pilot symbol data corresponding to pilot symbols and information symbol data corresponding to information symbols, in the sequence of communications symbol data;

generating a data-augmented estimate of the transfer characteristic from the pilot symbol data and the information symbol data, including the steps of:

generating an estimate of the transfer characteristic from the pilot symbol data;

identifying a group of information symbol data corresponding to a group of information symbols;

generating estimates of the group of identified information symbols from the group of information symbol data and a previously generated estimate of the transfer characteristic; and generating a new estimate of the transfer characteristic from the pilot symbol data, generated estimates of information symbols, and the information symbol data;

generating estimates of information symbols from the corresponding information symbol data and a generated estimate of the transfer characteristic; and decoding radiotelephone communications from the generated estimates of the information symbols.

2. A method according to claim 1 wherein said step of identifying a group of information symbol data comprises the step of identifying a group of information symbol data corresponding to a group of information symbols adjacent pilot symbols in the PSAM communications symbol sequence.

3. A method according to claim 1 wherein said step of identifying a group of information symbol data comprises the step of identifying a group of information symbols data corresponding to a group of information symbols adjacent previously estimated information symbols in the PSAM communications symbol sequence.

4. A method according to claim 1 wherein said step of identifying a group of information symbol data comprises the step of identifying a group of information symbol data corresponding to a group of information symbols in the PSAM communications symbol sequence such that estimates of the group of information symbols, generated from the group of information symbol data and a previous estimate of the transfer characteristic, have an associated error probability less than a predetermined threshold.

5. A method of recovering pilot symbol assisted modulation (PSAM) audiotelephone communications from a communications symbol data sequence representing a PSAM communications symbol sequence communicated over a audiotelephone communications channel having an associated transfer characteristic, the PSAM communications symbol sequence including a sequence of information symbols interleaved with a plurality of predetermined pilot symbols, the method comprising the steps of:

identifying pilot symbol data corresponding to pilot symbols and information symbol data corresponding to information symbols, in the sequence of communications symbol data;

generating a data-augmented estimate of the transfer characteristic from the pilot symbol data and the information symbol data, including the steps of:

generating an estimate of the transfer characteristic from the pilot symbol data;

identifying a group of information symbol data corresponding to a group of information symbols of the PSAM communications symbol sequence;

generating estimates of the group of information symbols from the group of information symbol data and a previously generated estimate of the transfer characteristic; and generating a new estimate of the transfer characteristic from the pilot symbol data, generated estimates of information symbols, and the information symbol data;

generating estimates of information symbols of the PSAM communications symbol sequence from the information symbol data and a generated estimate of the transfer characteristic; and decoding the radiotelephone communications from the generated estimates of the information symbols.

6. A method according to claim 5 wherein said step of identifying a group of information symbol data comprises the step of identifying a group of information symbols data corresponding to a group of information symbols adjacent pilot symbols in the PSAM communications symbol sequence.

7. A method according to claim 5 wherein said step of identifying a group of information symbol data comprises the step of identifying a group of information symbols data corresponding to a group of information symbols adjacent previously estimated information symbols in the PSAM communications symbol sequence.

8. A method according to claim 5 wherein said step of identifying a group of information symbol data comprises the step of identifying a group of information symbol data corresponding to a group of information symbols in the PSAM communications symbol sequence such that estimates of the group of information symbols, generated from the group of information symbol data and a previous estimate of the transfer characteristic, have an associated error probability less than a predetermined threshold.

9. A method of estimating a transfer characteristic of a radiotelephone communications channel from a sequence of communications symbol data representing a radiotelephone communications signal communicated over the radiotelephone communications channel, the radiotelephone communications signal representing a pilot symbol assisted modulation (PSAM) communications symbol sequence including a plurality of pilot symbols interleaved with a plurality of information symbols, the method comprising the steps of:

identifying pilot symbol data and information symbol data in the sequence of communications symbol data, the pilot symbol data corresponding to pilot symbols in the PSAM communications symbol sequence and the information symbol data corresponding to information symbols in the PSAM communications symbol sequence; and generating a data-augmented estimate of the transfer characteristic from the pilot symbol data and the information symbol data, including the steps of:

generating a first estimate of the transfer characteristic from the pilot symbol data;

identifying a group of information symbol data corresponding to a group of information symbols in the PSAM communications symbol sequence;

generating estimates of the group of information symbols from the group of information symbol data and the first estimate of the transfer characteristic; and generating a second estimate of the transfer characteristic from the group of information symbol data, the generated estimates of the group of information symbols and the pilot symbol data.

10. A method according to claim 9 wherein said step of generating a data-augmented estimate of the transfer characteristic further comprises the steps of:

identifying a new group of information symbol data corresponding to a group of information symbols in the PSAM communications symbol sequence;

generating estimates of the group of information symbols corresponding to the new group of information symbol data from the new group of information symbol data and a previous estimate of the transfer characteristic; and generating a new estimate of the transfer characteristic of the radiotelephone communications channel from the new group of information symbol data, the generated estimates of the new group of information symbols and the pilot symbol data.

11. A method according to claim 10 wherein said step of identifying a group of information symbol data comprises the step of identifying a group of information symbol data corresponding to a group of information symbols adjacent pilot symbols in the PSAM communications symbol sequence.

12. A method according to claim 10:

wherein said step of identifying a group of information symbol data comprises the step of identifying a group of information symbol data corresponding to a group of information symbols adjacent pilot symbols in the PSAM communications symbol sequence; and wherein said step of identifying a new group of information symbol data comprises the step of identifying a new group of information symbol data corresponding to a new group of information symbols adjacent previously estimated information symbols in the PSAM communications symbol sequence.

13. A method according to claim 9 wherein said step of identifying a group of information symbol data comprises the step of identifying a group of information symbol data corresponding to a group of information symbols in the PSAM communications symbol sequence such that estimates of the group of information symbols, generated from the group of information symbol data and the first estimate of the transfer characteristic, have an associated error probability less than a predetermined threshold.

14. A method according to claim 10:

wherein said step of identifying a group of information symbol data comprises the step of identifying a group of information symbol data corresponding to a group of information symbols in the PSAM communications symbol sequence such that estimates of the group of information symbols, generated from the group of information symbol data and the first estimate of the transfer characteristic, have an associated error probability less than a predetermined threshold; and wherein said step of identifying a new group of information symbol data comprises the step of identifying a new group of information symbol data corresponding to a new group of information symbols in the PSAM communications symbol sequence such that estimates of the new group of information symbols, generated from the group of information symbol data and the previous estimate of the transfer characteristic, have an associated error probability less than a predetermined threshold.

15. A pilot symbol assisted modulation (PSAM) radiotelephone communications system, comprising:

radiotelephone communications processing means for processing radiotelephone communications to produce a PSAM communications symbol sequence, said PSAM communications symbol sequence including a plurality of predetermined pilot symbols interleaved with a plurality of information symbols representing the processed radiotelephone communications;

a radiotelephone communications channel which communicates the PSAM communications symbol sequence and produces a sequence of communications symbol data representing the communicated sequence of communication symbols, said radiotelephone communications channel having an associated transfer characteristic;

symbol data identifying means responsive to said radiotelephone communications channel, for identifying pilot symbol data corresponding to pilot symbols and information symbol data corresponding to information symbols, in said sequence of communications symbol data;

transfer characteristic estimate generating means, responsive to said symbol data identifying means, for generating a data-augmented estimate of said transfer characteristic from said pilot symbol data and said information symbol data, including:

means for generating an estimate of said transfer characteristic from said pilot symbol data;

means for identifying a group of information symbol data corresponding to a group of information symbols;

means, responsive to said group identifying means, for generating estimates of the group of information symbols from the group of information symbol data and a previously generated estimate of the transfer characteristic; and means, responsive to said group estimate generating means, for generating a new estimate of the transfer characteristic from said pilot symbol data, generated estimates of information symbols, and said information symbol data;

information symbol estimate generating means, responsive to said symbol data identifying means and said transfer characteristic estimate generating means, for generating estimates of information symbols from the corresponding information symbol data and a generated estimate of the transfer characteristic; and decoding means, responsive to said information symbol estimate generating means, for decoding radiotelephone communications from the generated estimates of the information symbols.

16. A system according to claim 15 wherein said group identifying means identifies a group of information symbol data corresponding to a group of information symbols adjacent said pilot symbols in said PSAM communications symbol sequence.

17. A system according to claim 15 wherein said group identifying means identifies a group of information symbol data corresponding to a group of information symbols adjacent previously estimated information symbols in said PSAM communications symbol sequence.

18. A system according to claim 15 wherein said group identifying means identifies a group of information symbol data corresponding to a group of information symbols in the PSAM communications symbol sequence such that estimates of the group of information symbols, generated from said group of information symbol data and a previous estimate of the transfer characteristic, have an associated error probability less than a predetermined threshold.

19. An apparatus for recovering pilot symbol assisted modulation (PSAM) radiotelephone communications from a communications symbol data sequence representing a PSAM communications symbol sequence communicated over a radiotelephone communications channel having an associated transfer characteristic, the PSAM communications symbol sequence including a sequence of information symbols interleaved with a plurality of predetermined pilot symbols, the apparatus comprising:

symbol data identifying means for identifying pilot symbol data corresponding to pilot symbols and information symbol data corresponding to information symbols, in the sequence of communications symbol data;

transfer characteristic estimate generating means, responsive to said symbol data identifying means, for generating a data-augmented estimate of the transfer characteristic from said pilot symbol data and said information symbol data, including:
means for generating an estimate of the transfer characteristic from said pilot symbol data;
means for identifying a group of information symbol data corresponding to a group of information symbols of the PSAM communications symbol sequence;

means, responsive to said group identifying means, for generating estimates of the group of information symbols from said group of information symbol data and a previously generated estimate of the transfer characteristic; and means, responsive to said symbol group estimate generating means, for generating a new estimate of the transfer characteristic from said pilot symbol data, generated estimates of information symbols, and said information symbol data;

information symbol estimate generating means, responsive to said symbol data identifying means and to said transfer characteristic estimate generating means, for generating estimates of information symbols of the PSAM communications symbol sequence from said information symbol data and a generated estimate of the transfer characteristic; and decoding means, responsive to said information symbol estimate generating means, for decoding radiotelephone communications from the generated estimates of the information symbols.

20. An apparatus according to claim 19 wherein said group identifying means comprises means for identifying a group of information symbols data corresponding to a group of information symbols adjacent pilot symbols in the PSAM communications symbol sequence.

21. An apparatus according to claim 19 wherein said group identifying means comprises means for identifying a group of information symbol data corresponding to a group of information symbols adjacent previously estimated information symbols in the PSAM communications symbol sequence.

22. An apparatus according to claim 19 wherein said group identifying means identifies a group of information symbol data corresponding to a group of information symbols in the PSAM communications symbol sequence such that estimates of said group of information symbols, generated from said group of information symbol data and a previous estimate of the transfer characteristic, have an associated error probability less than a predetermined threshold.

* * * * *